US010482528B2

(12) United States Patent
Sheykhetov

(10) Patent No.: US 10,482,528 B2
(45) Date of Patent: Nov. 19, 2019

(54) PHILATELIC SEARCH SERVICE SYSTEM AND METHOD

(71) Applicant: Boris Sheykhetov, San Francisco, CA (US)

(72) Inventor: Boris Sheykhetov, San Francisco, CA (US)

(*) Notice: Subject to any disclaimer, the term of this patent is extended or adjusted under 35 U.S.C. 154(b) by 206 days.

(21) Appl. No.: 15/488,518

(22) Filed: Apr. 17, 2017

(65) Prior Publication Data

US 2017/0301009 A1      Oct. 19, 2017

Related U.S. Application Data

(60) Provisional application No. 62/323,669, filed on Apr. 16, 2016.

(51) Int. Cl.
*G06Q 30/08* (2012.01)
*G06N 3/08* (2006.01)
*G06Q 30/06* (2012.01)
*G06F 16/51* (2019.01)
*G06F 16/583* (2019.01)

(52) U.S. Cl.
CPC ............ *G06Q 30/08* (2013.01); *G06F 16/51* (2019.01); *G06F 16/5846* (2019.01); *G06N 3/08* (2013.01); *G06Q 30/0601* (2013.01)

(58) Field of Classification Search
CPC .......... G06F 16/00; G06F 16/24; G06F 16/58; G06F 16/951; G06F 17/30253; G06F 17/3028; G06F 17/3053; G06F 17/30864; G06N 3/08; G06Q 30/06; G06Q 30/0601; G06Q 30/0603; G06Q 30/0625; G06Q 30/08; Y10S 707/99933; Y10S 707/99931
See application file for complete search history.

(56) References Cited

U.S. PATENT DOCUMENTS

| | | | | |
|---|---|---|---|---|
| 6,785,671 | B1* | 8/2004 | Bailey | G06Q 10/02 705/5 |
| 8,983,939 | B1* | 3/2015 | Wang | G06F 16/5838 707/723 |
| 2002/0065744 | A1* | 5/2002 | Collins | G06Q 30/06 705/26.64 |
| 2004/0199430 | A1* | 10/2004 | Hsieh | G06Q 30/02 705/26.62 |
| 2005/0131764 | A1* | 6/2005 | Pearson | G06Q 30/06 705/26.1 |
| 2006/0095345 | A1* | 5/2006 | Ka | G06Q 30/0603 705/26.62 |
| 2009/0177630 | A1* | 7/2009 | Gore | G06F 16/90 |
| 2009/0271390 | A1* | 10/2009 | Zheng | G06F 16/90324 |
| 2009/0285448 | A1* | 11/2009 | Carpenter | G06Q 30/0283 382/101 |
| 2010/0086192 | A1* | 4/2010 | Grigsby | G06K 9/00 382/141 |

(Continued)

OTHER PUBLICATIONS

"FindYourStampsValue.com." Archived by the Internet Archive on Mar. 15, 2017: <http://web.archive.org/web/20170315125051*/http://www.findyourstampsvalue.com:80/>. pp. 1-8. (Year: 2017).*

*Primary Examiner* — Christopher Biagini
(74) *Attorney, Agent, or Firm* — Larisa Migachyov

(57) ABSTRACT

A philatelic online search system and method is disclosed, comprising a unified catalog and a search system that quickly filters out irrelevant search results.

9 Claims, 5 Drawing Sheets

(56) References Cited

U.S. PATENT DOCUMENTS

| | | | |
|---|---|---|---|
| 2011/0191336 A1* | 8/2011 | Wang | G06F 16/00 |
| | | | 707/728 |
| 2013/0297464 A1* | 11/2013 | Jaquez | G06Q 20/36 |
| | | | 705/28 |
| 2014/0095463 A1* | 4/2014 | Pappas | G06F 16/951 |
| | | | 707/706 |
| 2018/0158120 A1* | 6/2018 | Lehmann | G06Q 30/0603 |

* cited by examiner

PHILATELIC SEARCH SERVICE SYSTEM AND METHOD

CROSS-REFERENCE TO RELATED APPLICATIONS

The present application takes priority from Provisional App. No. 62/323,669, filed Apr. 16, 2016, which is incorporated herein by reference.

BACKGROUND

Philately is an important and interesting hobby for many people. The number of stamp collectors in the world is huge, and each collector has their own requirements for what they are collecting and what they need to complete their collection.

Since there are many people who are selling stamps and many different marketplaces, stores, auctions, and other venues where someone may buy stamps, it often takes a lot of time and effort for a collector to find that one stamp they need to complete their collection. It is frequently unrealistic to look through all the possible sellers and find the best prices.

Stamp catalogues are standardized reference books that list all the existing stamps in a particular country or particular area, and are widely used by stamp collectors. Stamp catalogues, however, are not standardized between each other; each stamp catalogue describes stamps in a slightly different way and assigns different reference numbers to the same stamp. Different stamp collectors use different stamp catalogues to describe their stamps when offering them for sale or requesting them for purchase. To complicate the issue, stamp catalogues are published in different languages.

Since a seller may use any catalogue in describing a stamp offered for sale, if a buyer is not familiar with that particular catalogue, they may miss the stamp they are looking for.

Also, since most search engines are not specifically optimized for stamps, and since stamps are described in different ways in different catalogues, any search query will often turn up millions of irrelevant results. A user may miss a listing they could have been interested in because it is buried in a million irrelevant listings for stamps that may have similar names, or stamps that have similar descriptions, and so on.

In addition, many stamps are sold by individual dealers or small shops that may not have enough of a search-engine presence to come up in the first few search results in a search query. Some stamps are sold in closed auctions and thus would not come up in any search results at all. Some stamps are sold by individual dealers who do not have any web presence at all. A user searching for that perfect stamp that completes their collection will have a difficult time finding any of these.

A need exists for a centralized system that can search multiple marketplaces and sellers of stamps and quickly filter out irrelevant search results to leave only the relevant results.

LIST OF FIGURES

SUMMARY OF THE INVENTION

Figure 1:
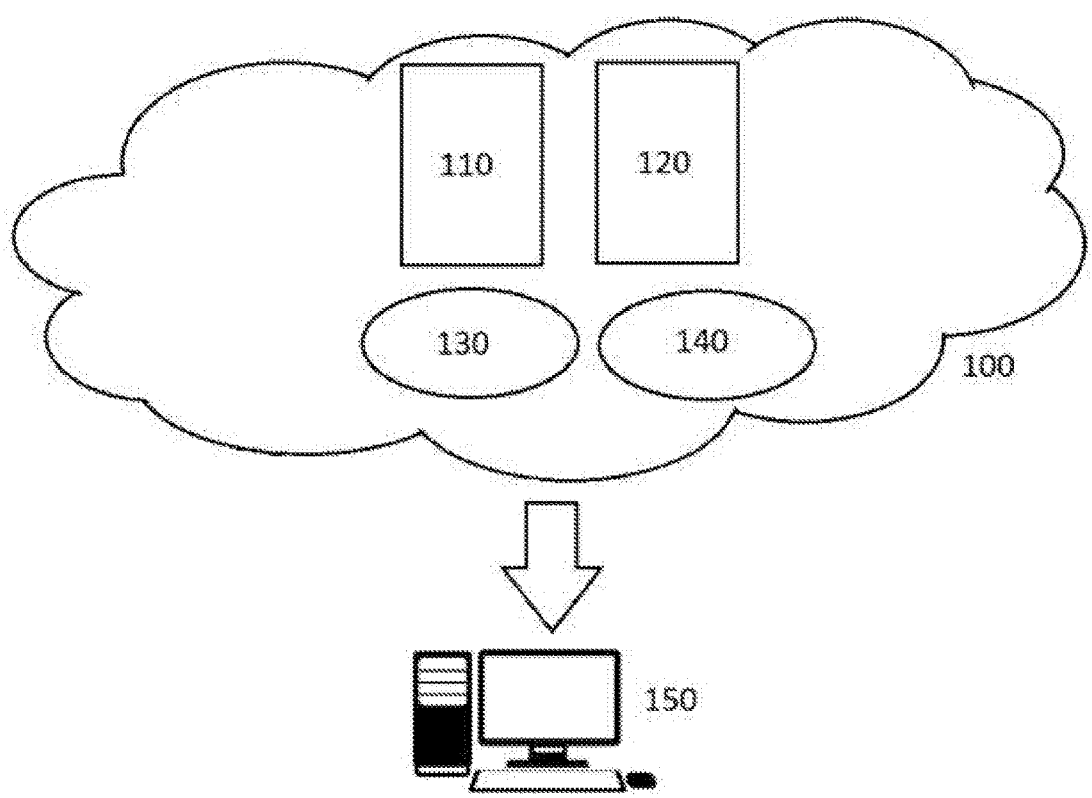
FIG. 1 shows a diagram of the preferred embodiment of the system of the present invention.

An object of the present invention is to provide a centralized system that enables a user to quickly and easily search all the available sources for philatelic material.

Another object of the present invention is to provide a system and method that enables quick and easy filtering out of irrelevant search results in a search for philatelic material.

The method of the present invention preferably comprises compiling two databases and placing them on a server; the first database is an aggregated catalogue, compiled from at least two stamp catalogues, and the second database is an aggregated database of stamps offered for sale, wherein the sources for that database comprise at least one online store, at least one online store, at least one individual seller, at least one auction site, and at least one real-world store. A first neural network is trained to associate at least one keyword with at least one stamp; a second neural network is trained to identify whether an image contains a stamp and whether the stamp matches a reference stamp. A first search query is entered into a search interface connected to the server; the first neural network is then used to parse the search query, identify any keywords, and use the keywords to identify a name and catalogue number for a stamp. Once the name and catalogue number is identified, the system then searches for the stamp in the aggregated catalogue and determines at least one other parameter associated with the stamp. The first neural network is then used to create at least one second search query associated with the stamp. All of the search queries are then used to conduct a search in the aggregated database, and at least one search result is received.

After the at least one search result is received, the text of the search result is analyzed using the first neural network to determine whether the text is associated with the desired stamp. If the text is associated with the desired stamp, the search result is fed into a second neural network, which determines whether or not it contains an image, and whether or not the image contains a stamp. If the image contains a stamp, the second neural network is then used to compare the stamp in the image with the stamp in the aggregated catalogue listing. If the stamp matches, the search result is displayed for the user.

The at least one other parameter associated with the stamp can be an illustration number, denomination, method used to print the stamp, country of issue, date of issue, year of issue, subject matter pictured in the illustration, person pictured on the stamp, color, perforations, condition, theme, print run, face value.

The aggregated database of stamps offered for sale may use the following sources: online marketplaces, public auctions, Internet auctions, online shops, individual dealers.

The aggregated catalogue may comprise at least one catalogue in a first language and at least one catalogue in a second language distinct from the first language.

The aggregated catalogue may comprise the stamp catalogues listed in claim 5 of the present disclosure.

In an embodiment, the method of the present invention may also comprise enabling a user to purchase a desired stamp.

In an embodiment, a human expert may be put in communication with the user to assist the user in making the search.

The method of the present invention may further comprise enabling the user to purchase a desired stamp.

The method of the present invention may further comprise recording at least one item of information about the user, such as the user's name, the user's mailing address, the user's credit card information, the user's prior orders, the user's order, the user's search history, whether the user bought anything after searching.

In an embodiment, the information in the aggregated database may be updated, where the information may be selected from the following group: catalogue+reference number, country, name, date of issue, face value, condition, color, perforation, watermark, paper type, text description, price, availability.

The system of the present invention preferably comprises a server, wherein the server comprises an aggregated catalogue database, comprising information from at least two stamp catalogues, and an aggregated database of stamps offered for sale, wherein the aggregated database comprises at least one online store, at least one individual seller, at least one auction site, and at least one real-world store. There are two neural networks—a syntax analyzer neural network and an image analyzer neural network. The syntax analyzer neural network is configured to perform the following actions: analyze a search query to identify at least one first keyword or key phrase; identify a stamp based on the at least one first keyword or key phrase; given a stamp, generating at least one second keyword or key phrase related to the stamp; using the at least one second keyword or key phrase to generate at least one second search query. The image analyzer neural network is configured to perform the following actions: determine if a web page contains an image; determine if an image depicts a stamp; if an image depicts a stamp, determine if the stamp matches a reference image of a stamp. The system also comprises a search engine that can search the aggregated catalogue database and the aggregated database of stamps offered for sale. At least one user computer is in communication with the server, and is configured to transmit a search query to the server and to display search results for the user.

DETAILED DESCRIPTION OF THE PREFERRED EMBODIMENT

Definitions

A "stamp" is any philatelic object that a user needs to search for. While the present disclosure refers to "stamps", an envelope with a stamp on it, or a collection of stamps, may also be encompassed in the present invention.

A "user" is someone who is searching for a stamp.

An "expert" is a person who assists a user in searching for a stamp.

A "stamp catalogue" is a standardized listing of stamps comprising descriptions and prices. Some stamp catalogues, such as the Michel, Scott, Stanley Gibbons, and Yvert et Tellier catalogues, have a worldwide coverage; some are national. Some stamp catalogues are only offered in printed form, and some are online (and some are both).

Disclosure

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

With reference now to the Figures, the system of the present invention preferably comprises several modules, as shown in FIG. 1. A server 100, in communication with at least one user's computer 150, is used to store two databases. The first database, an aggregated catalogue 110, is compiled from at least two existing stamp catalogues; the information from each stamp catalogue is standardized so that each stamp is associated with at least one other item of information, such as a reference number. In the preferred embodiment, the following additional descriptors are used for each stamp:
a. Catalogue+reference number
b. Product type (i.e. stamp, stamped envelope, set of stamps, etc.)
c. Country
d. Name
e. Date of issue
f. Face value
g. Condition
h. Color
i. Perforation
j. Watermark
k. Paper type
l. Text description (may contain all previous fields)
m. Additional text description In the preferred embodiment, the aggregated catalogue 110 is multilingual by design; foreign-language catalogues that are added to the aggregated catalogue may not necessarily be translated into English. However, in other embodiments, foreign-language catalogues may be translated into one common language before being added to the aggregated catalogue 110.

The catalogues that are added to the aggregated catalogue are preferably all the available stamp catalogues in every country where stamp catalogues are published. At least the following catalogues are preferably added to the aggregated catalogue:

AFA specialkatalog: Danmark, Fcroerne, Gronland, Dansk Vestindien og Slesvig (Denmark)
Afinsa (Portugal)
Anfils (Spain)
Australasian stamp catalogue (Australia)
Austria Netto Katalog (ANK) (Austria)
BALE (Israel)
Barefoot Catalogue (Revenues)
Bolaffi (Italy)
Borek (World catalogue)
Brusden-White (Australia)
Burak Pul Evi Kataloğu—Spesyalize Türk Pullari Kataloğu (Specialized Postage Stamp Catalog of Turkey)
Burak Pul Evi Yayinlari—Ilk Türk Pullari/Tugrali Pullar (The First Turkish Stamps Stamps with the monogram of the Sultans)
Catalogue of USSR postage stamps (Soviet Union, Russia; Каталог почтовых марок СССР)
Campbell Paterson (New Zealand)
Chan Stamp Catalogue of China (1878-1949)
CEI (Italy)
Cérès (France)
Chuchin, F. G. (Russia—Zemstvos)
Comprehensive Colour Catalogue of Australian Stamps
Dallay (France)
Domfil (Spain)
Edifil (Spain)
Facit catalog (all countries of Scandinavia)
Farahbakhash Catalogue Of 2010: The Stamps Of Iran—Qajar, Pahlavi, Islamic Republic Of Iran (Iran)
Fischer catalog (Poland)
Find Your Stamps Value (specializing in US, GB, Russia and Germany stamps)
Freestampcatalogue
Froede (Germany, active to 1941)
Hellas 2012: stamp catalogue and postal history=katalogos grammatosēmōn kai tachydromikē historia (Greece)
Hermes (Greece)
Hibernian (Ireland)
Holmes (Canada, published from 1935 to 1968)
Inoubli (Tunisia)
Isfila (Turkey)
Jacobs, V. A. (Russia—USSR special catalogue)
JB Catalogue (Malta)
JSCA Nissen Japanese Stamp Specialized Catalog (Japan)
JSDA Japanese Stamp Catalogue (Japan)
Katalog Prangko Indonesia=Indonesian postage stamp catalogue (Indonesia)
LAPE (Finland)
Lipsia (until 1990), only stamp catalog of the DDR. (Editor: Verlag Transpress Leipzig, DDR)
Livingston "Catalog of the Shanghai Postal System" (Wei-Liang Chow 2nd edition 1990)/(L. F. Livingston First edition 1971)
Ma's Illustrated Catalogue Of The Stamps Of China (China)
MacDonnell Whyte (Stamps of Ireland Specialised Catalogue)
Magyar Posta és Illetékbélyeg Katalógus (Hungary)
Maury (France), A specialized catalog of France formed from the combination of Cérès and Dallay
Michel catalog (Germany)
Minkus (USA, active until 2004)
Newfoundland specialized stamp catalogue (Canada)
Ngo's Catalogue of Philippine Republic Stamps & Postal Stationeries (Philippine)
Norgeskatalogen (Norway)
Norma Norma [year]—a specialized catalog of Finland postage stamps published annually, tri-lingual (Finnish, Swedish, English)
NVPH Speciale Catalogus (The Netherlands & colonies)
OBP-COB (Belgium)
Phila India (India)
Philex (Germany)
Pofis catalogue (Czechoslovakia)
Postage Stamps Catalogue of the People's Republic of China (China), China Posts and Telecom Press
Prifix (Luxembourg)
Pulko (Turkey)
Pulko Osmali İmpararatorluğu ve Türkiye Cumhuriyeti Posta Pullari Kataloğu (Ottoman Empire and Republic of Turkey Postage Stamp Catalog)
Pulhan: Türk Pullari Kataloğu (Turkey Postage Stamp Catalog)
Richard Zimmermann Catalog (The joint stamp issues catalog)
Ruch catalog (Poland)
Sakura Catalogue of Japanese Stamps (Japan)
Sanabria's Air Post Catalogue (Worldwide airmail stamps; last full catalog, 1966; partial, 1972)
Sassone (Italy)
Schiffer catalog: Catálogo de Selos do Brasil (Brazil)
Scott catalogue (USA)
Sellos postales argentinos: 1856-2010 (Argentina)
Standard Catalogue of Maylaysia, Singapore, Brunei, Steven Tan, International Stamp & Coin Sdn. Bhd.
V. U. Soloviev (Russia)
Siddiqui Stamps Catalogue (Pakistan)
The South African stamp colour catalogue (South Africa)
Stanley Gibbons (Great Britain)
Suriwongse (Sakserm) until 2004 (Thailand)

Thai Stamps Catalogue (Thailand), Somchai Saeng-Ngern

Taiwan Color Catalogue, Alex Yeh[1]

Umungwan Korean Postage Stamp Catalogue (South Korea)

Unificato (Italy)

Unitrade Specialized Catalogue of Canadian Stamps

Yang (Hong Kong, Liberated areas, PRC)[1]

Yvert et Tellier (France)

Zagorsky Standard Collection (Russia)

Zonnebloem (Netherlands, Indonesia, Israel, Surinam, United Europe)

Zumstein (Switzerland)

It is to be understood that the above list is non-exclusive and that other stamp catalogues may be added to the aggregated catalogue as well; furthermore, not every stamp catalogue on the above list may be added to the aggregated catalogue in some embodiments of the invention.

The server 100 is also used to store an aggregated database 120 of outer platforms—i.e. sources of stamps offered for sale. Such outer platforms may fall into several distinct categories:

a. Online marketplaces such as eBay. About 50 such marketplaces exist for philatelic materials. Typically, such marketplaces have an open API.

b. Huge public auctions; such auctions are typically conducted 5-6 times a year. About 100 such auctions exist for philatelic materials; the number of lots at each auction can range from 2000-10000. Access to these auctions may be limited by authorization, which may complicate a typical searcher's access to these lots.

c. Internet auctions. Typically, such auctions are conducted 6-12 times a year; lots are placed up for auction a month prior to the auction. About 1000-5000 such auctions exist.

d. Online shops. About 10000-50000 such shops exist.

e. In-person dealers. While it is not certain how many such people exist, an estimate can range from 10000-50000. Such dealers do not have online shops or websites; at best, there is an email address for contact. If such people are to be added to the aggregated database, a list of available products can be obtained from each dealer and manually added to the database.

For each source, a different method of gathering information may be used. For online marketplaces such as eBay or Amazon, since they typically have an open API, the server may simply access the marketplace's database via this accessible API. For a closed API (i.e. strictly specialized sites and portals for philately specialists), reverse engineering may be needed to access the data. If the source does not have an API and access to its information is only carried out via web pages, the HTML code needs to be parsed to extract the listings.

After the data is extracted from each source platform, it is typically needed to be processed in order to put it in a standardized format to add it to the aggregated database. The listings from each source are preferably periodically updated as needed.

The below table shows an exemplary embodiment of a listing for a platform in the aggregated database:

| Main fields: | Description |
| --- | --- |
| Platform name | Platform name that is displayed to the Client |
| Address | Root link to the Platform |
| Region | Standard form for the location of the Platform |
| Type | Standard type: auction, marketplace, on-line shop, etc. |

The below table shows an exemplary embodiment of a listing of a stamp in the aggregated database:

| | Description |
| --- | --- |
| Main fields: | |
| Images | Image file of a standard extension |
| Name | Name of the Product |
| Type of the Product | Stamp, envelope, etc. |
| Price | Recommended price from the catalogue |
| Catalogue name | Name of the Catalogue in which the Product was found |
| Product code in the Catalogue | Product code from this Catalogue |
| Additional fields: | |
| Country | Country of issue |
| Face value | 10 cents, 1 dollar, etc. |
| Date of issue | Date of issue |
| Perforation | Definite type |
| Paper | Definite type |
| Watermark | Definite type |
| Color | Definite type |

The system of the present invention also comprises two neural networks. One neural network is a syntax analyzer 130, trained to analyze text. The syntax analyzer is trained to perform two tasks:

a. Associate keywords or key phrases in a search query with particular stamps;

b. Generate search query comprising keywords or key phrases by association with a particular stamp.

In order to perform the first task, the syntax analyzer is preferably also capable of parsing the search query to identify any keywords and key phrases. In an alternate embodiment, a separate parsing module may be used for that purpose.

The other neural network is an image analyzer 140; the image analyzer is trained to perform the following two tasks:

a. determine whether or not a given image contains a stamp;

b. determine whether or not the image of a stamp matches a reference image of a stamp.

The two neural networks may be located on the same server as the databases or a different server. The use of the image analyzer 140 and the syntax analyzer 130 is described below.

Figure 2A:
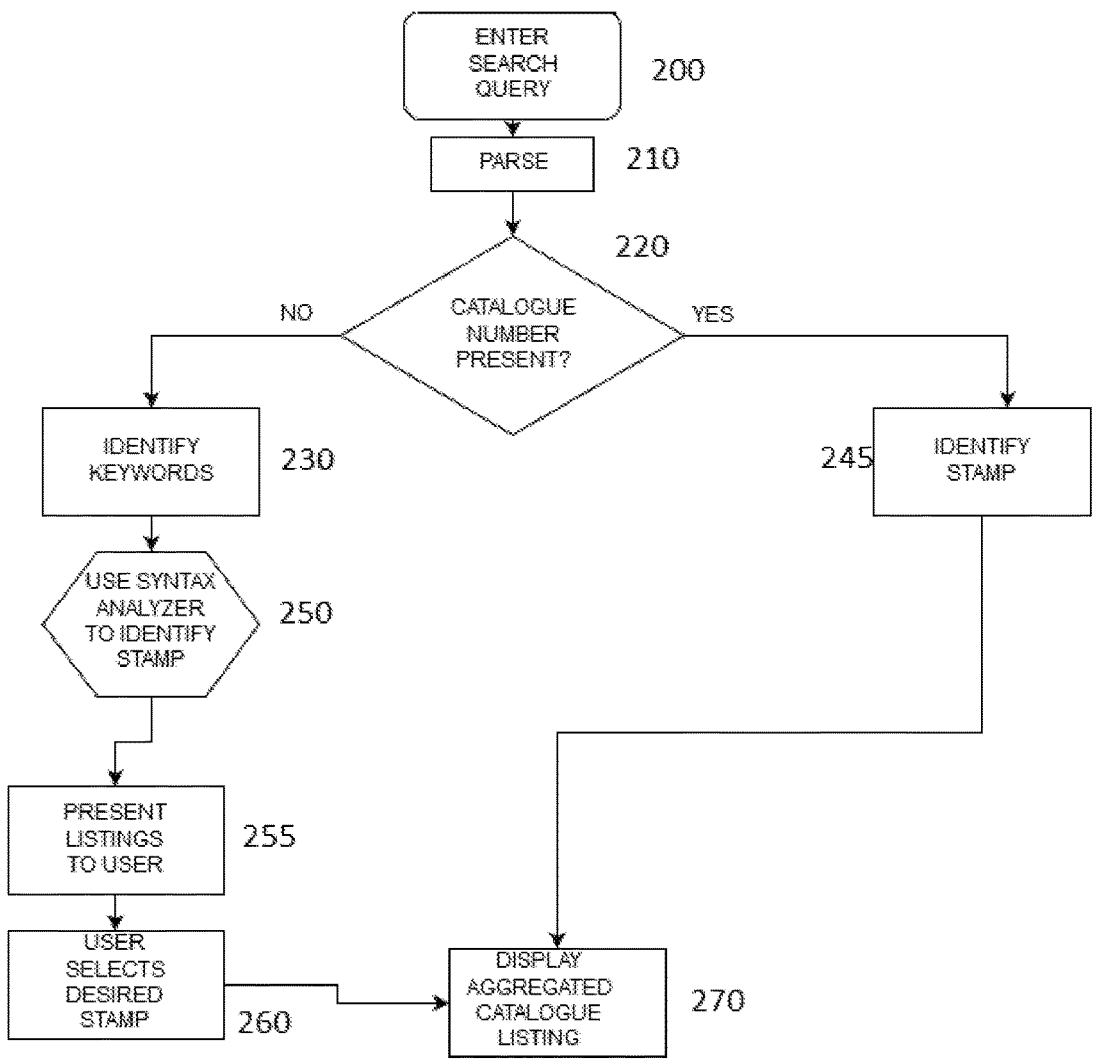
FIG. 2A shows a diagram of the preferred embodiment of part of the method of the present invention.

FIG. 2A shows a flowchart showing an embodiment of part of the method of the present invention. As the first step, a user enters a search query 200 into a search interface on a computer connected to the server. The search query may or may not include the name of a stamp and/or a catalogue number. For example, a user may search for "Scott 1" (i.e. reference number 1 in the Scott catalogue), or may search for "giraffe stamp" (i.e. keyword search).

Figure 3:
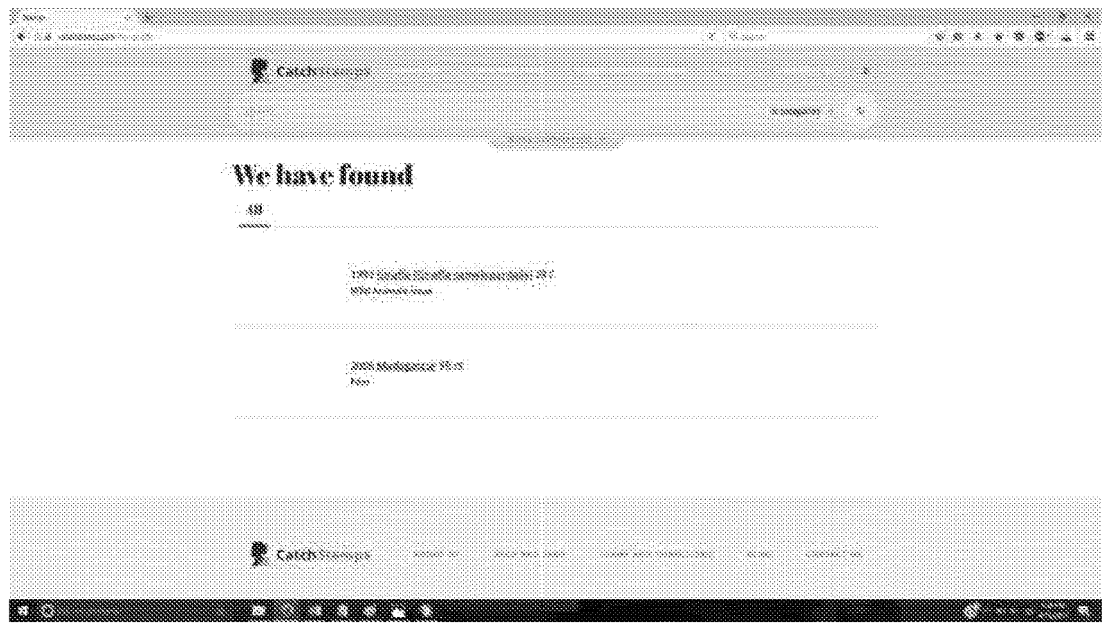
FIG. 3 shows a screenshot from an implementation of the preferred embodiment of the present invention.

After a query is entered into the system and parsed 210, the syntax analyzer identifies the stamp or stamps associated with the query. The syntax analyzer checks 220 whether or not the query contains a reference number and a catalogue name from which the reference number is found; if it does, the search query is simply passed on to the aggregated catalogue, the stamp is identified 245, and the listing for that stamp is displayed. If the search query does not comprise a reference number or a catalogue name, the syntax analyzer identifies any keywords 230 and finds any stamp or stamps associated with the keywords or key phrases in the search query 250. The listings for all these stamps are presented to the user 255. An example screenshot for the keyword "giraffe" is shown in FIG. 3.

Figure 4:
FIG. 4 shows a screenshot from an implementation of the preferred embodiment of the present invention.

If a user clicks on a particular stamp listing 260, the complete aggregated catalogue listing for that stamp is displayed 270. FIG. 4 shows a screenshot of such a listing. Any additional information regarding that particular stamp may be displayed for the user.

Figure 2B:
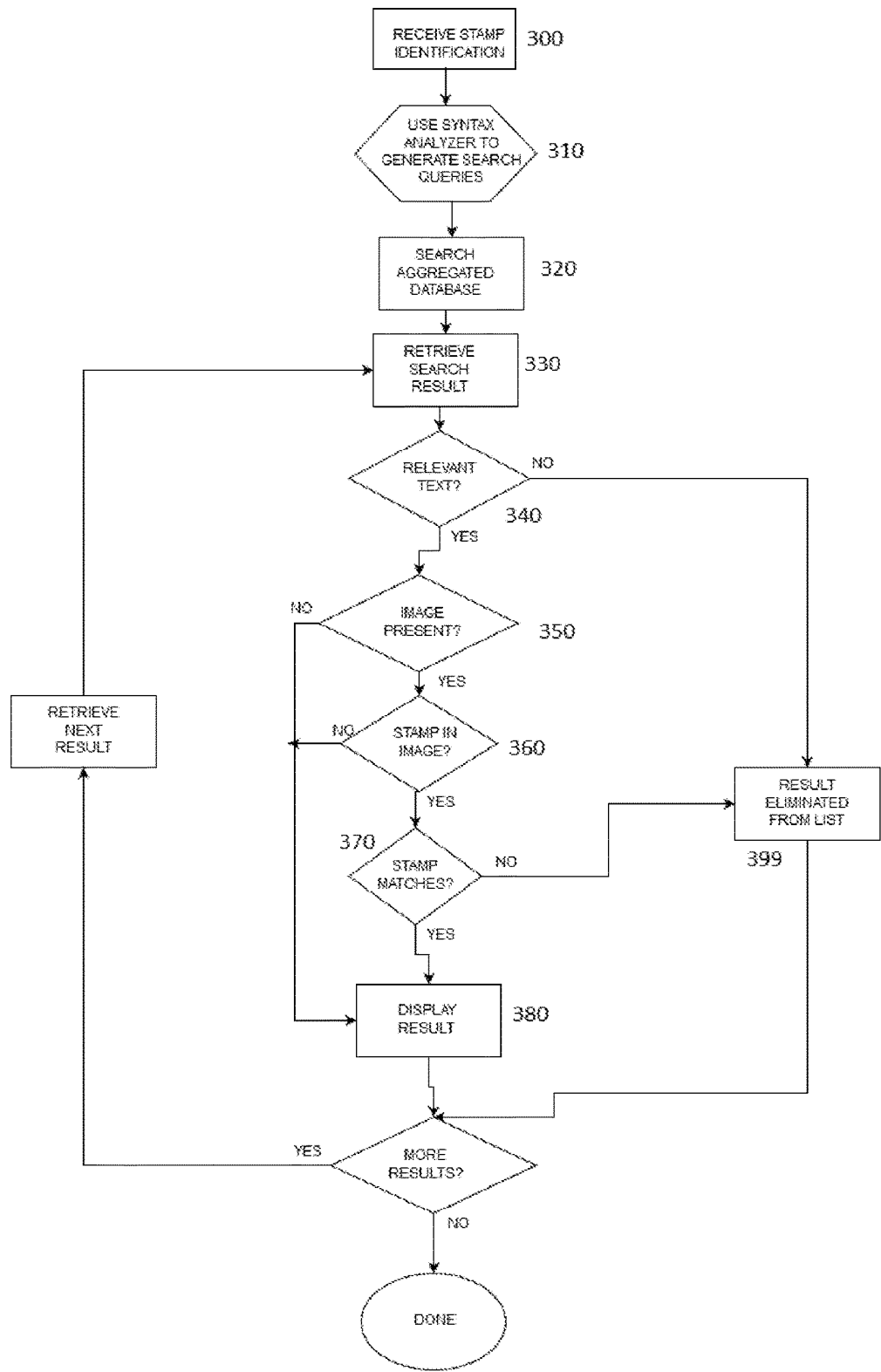
FIG. 2B shows a diagram of the preferred embodiment of part of the method of the present invention.

Next, as shown in FIG. 2B, the system searches the aggregated database of sources for any lots that match that particular stamp listing. In the preferred embodiment, after the stamp identification is performed 300, the syntax analyzer is used to generate additional search queries 310 based on the information in the aggregated catalogue listing. For example, for the stamp listing shown in FIG. 3, the system may generate search queries such as:

a. Michel US 2323
b. Yvert et Tellier US 2115
c. Scott US 2705
d. Giraffe 1992
e. Geraffe 1992

Each one of the search queries is then used to search the aggregated database 320. In the preferred embodiment, a timer countdown is used to give the user an approximate time for the execution of the search.

Since it is expected that a lot of irrelevant results will be produced by the search, the syntax analyzer and image analyzer are then used to filter out irrelevant results before the search results are presented to the user. In the preferred embodiment, the process works as shown in FIG. 2B.

Each search result, prior to being presented to the user, is fed into the syntax analyzer 330. It is assumed that each search result comprises a webpage such as an eBay listing or an auction listing, though this is not necessarily the case; in any event, it is expected that a search result will comprise text and possibly an image. The syntax analyzer analyzes any text contained in the search result and determines 340 whether or not the text is associated with the same stamp as the object of the user's query—i.e. whether or not it is relevant. In the preferred embodiment, the syntax analyzer is trained to associate particular keywords with particular stamps; if the keywords in a search result are associated with a different stamp from the one the user is searching for, the search result is eliminated as irrelevant 399. The remaining search results are then passed on to the image analyzer.

After each result is passed to the image analyzer, the image analyzer performs two actions. First, it determines whether or not the result contains any images 350 and whether or not any of those images contain a stamp 360. If the result does not contain any images, or the images do not contain stamps, the search result is displayed for the user 380. If the result contains an image of a stamp, the image is compared 370 to a reference image for the stamp that is taken from the aggregated catalogue. If the image does not match, the search result is eliminated as irrelevant 399 and the next search result is analyzed (if any). Any relevant results are displayed for the user 380.

In an embodiment (not shown), manual search assist is offered as an additional step if the above algorithm is not successful in producing search results for the user. For that embodiment, a human expert is put in communication with the user, and assists the user in coming up with a better search query or conducts the search for the user. In the preferred embodiment, the system may make a pop-up chat window available for that purpose. The user may request manual search assist, or it may be offered automatically if the user's search query does not turn up any results. In the preferred embodiment, the user is prompted to pay a fee for manual search assist. Furthermore, the user is prompted to rate the expert's performance after the assist is over.

In the preferred embodiment, a user is able to upload a document to the chat window to enable the expert to see the client's orders. The expert's photo may be displayed during chat to further personalize the experience.

In an embodiment, once the user selects a stamp for purchase, the system simply directs the user to the relevant seller's website or other contact information (for example, directing the user to the eBay sales page for that stamp). In another embodiment, the system assists the user in making the order, collects the user's payment, and finalizes the order with the seller or sellers; in this embodiment, multiple sellers can be contacted in the same order (i.e. one stamp from one seller and another stamp from another seller). This simplifies the process for the user.

In either of the above two embodiments, the system preferably tracks the user's order history and whether or not a given search resulted in an order. The information regarding the order is then passed along to the syntax analyzer to further train the associations between various keywords and particular stamps. In that embodiment, a profile is created for the user. The profile may preferably comprise the following information, though any other information may also be included:

| Main fields: | Description |
| --- | --- |
| e-mail | User's email address |
| Password | With the function "Repeat the password" |
| Form of address | Mr., Mrs. |
| Surname | user's surname |
| Name | user's name |
| Contact number | Telephone number of certain international format |
| Client's avatar | Possibility for the user to upload photo from HDD |
| Country | Function of choice from a falling list |
| Address of postal delivery | For the delivery of the Order |

In the preferred embodiment, cloud services are used to implement the system and method of the present invention. AWS (Amazon Web Services) is one of the most appropriate systems for implementing such a service, though any other cloud-based service is also appropriate. While it is also possible to implement the system and method on one or more hardware server, a cloud service is used in the preferred embodiment of the present invention due to a savings in cost and maintenance.

It will be apparent to those of skill in the appertaining arts that various modifications can be made within the scope of the above invention. Accordingly, this invention is not to be considered limited to the specific examples chosen for purposes of disclosure, but rather to cover all changes and modifications which do not constitute departures from the permissible scope of the present invention. Having thus described the invention, what is desired to be secured and covered by Letters Patent is presented in the appended claims.

The invention claimed is:

1. A method for searching for stamps online, comprising:
compiling an aggregated catalogue from at least two stamp catalogues and storing the aggregated catalogue on a server;
compiling an aggregated database of stamps offered for sale, wherein the aggregated database comprises at least one online store, at least one individual seller, at least one auction site, and at least one real-world store, and storing the aggregated database on the server;
training a first neural network to associate at least one keyword or key phrase with at least one stamp;
training a second neural network to determine whether an image contains at least one stamp and to determine whether the at least one stamp matches another image containing a stamp;
entering a first search query into a search interface connected to the server;
using the first neural network to parse the first search query, identify any keywords or key phrases, and to use the keywords or key phrases to identify a name and a catalogue number for a desired stamp;
searching for the stamp in the aggregated catalogue and determining at least one other parameter associated with the stamp;
using the first neural network to create at least one second search query associated with the stamp;
using the first search query, the at least one second search query, and the name and catalogue number of the stamp to conduct a search in the aggregated database of stamps offered for sale, and receiving at least one search result, said at least one search result comprising text;
using the first neural network to analyze the text associated with each one of the at least one search result, to parse the text, to identify at least one keyword or key phrase, and to determine whether the at least one keyword or key phrase is associated with the desired stamp;
if the at least one keyword or key phrase is associated with the desired stamp, determining if the at least one search result comprises an image;
using the second neural network to determine whether or not the image comprises a stamp;
if the image comprises a stamp, using the second neural network to determine whether or not the stamp in the image matches an image of the desired stamp found in the aggregated catalogue;
if the stamp in the image matches the image of the desired stamp, classifying the at least one search result as relevant;
displaying any relevant search results to the user.

2. The method of claim 1, wherein the at least one other parameter is selected from a list comprising: illustration number, denomination, method used to print the stamp, country of issue, date of issue, year of issue, subject matter pictured in the illustration, person pictured on the stamp, color, perforations, condition, theme, print run, face value.

3. The method of claim 1, wherein the aggregated database comprises stamps listed for sale on at least one online marketplace, at least one public auction, at least one Internet auction, at least one online shop, and at least one individual dealer.

4. The method of claim 1, wherein the aggregated catalogue comprises at least one catalogue in a first language and at least one catalogue in a second language, the second language being distinct from the first language.

5. The method of claim 1, further comprising:
after displaying the search results for the user, enabling the user to purchase a desired stamp.

6. The method of claim 1, further comprising:
providing a communication interface for a user to communicate with a search expert.

7. The method of claim 1, further comprising:
recording at least one item of information about the user, wherein the at least one item of information is selected from the following group: the user's name, the user's mailing address, the user's credit card information, the user's prior orders, the user's order, the user's search history, whether the user bought anything after searching.

8. The method of claim 1, further comprising:
if needed, updating any information in the aggregated database related to the stamp searched for by the user, wherein the information may be selected from the following group: catalogue+reference number, country, name, date of issue, face value, condition, color, perforation, watermark, paper type, text description.

9. A system for searching for stamps online, comprising:
a server comprising the following:
an aggregated catalogue database, said aggregated catalogue database comprising information taken from at least two stamp catalogues;
an aggregated database of stamps offered for sale, wherein the aggregated database comprises at least one online store, at least one individual seller, at least one auction site, and at least one real-world store;
a syntax analyzer neural network, wherein the syntax analyzer neural network is configured to perform the following actions:
analyze a search query to identify at least one first keyword or key phrase;
identify a stamp based on the at least one first keyword or key phrase;
given a stamp, generating at least one second keyword or key phrase related to the stamp;
using the at least one second keyword or key phrase to generate at least one second search query;
an image analyzer neural network, wherein the image analyzer neural network is configured to perform the following actions:
determine if a web page contains an image;
determine if an image depicts a stamp;
if an image depicts a stamp, determine if the stamp matches a reference image of a stamp;
a search engine, wherein the search engine is configured to perform the following actions:
search the aggregated catalogue database;
search the aggregated database of stamps offered for sale;
at least one user computer in communication with the server, wherein the at least one user computer is configured to perform the following actions:
transmit a search query to the server;
display search results for the user.

* * * * *